US009116603B2

(12) United States Patent
Nielsen et al.

(10) Patent No.: US 9,116,603 B2
(45) Date of Patent: Aug. 25, 2015

(54) MANAGING INTERACTIONS WITH DATA HAVING MEMBERSHIP IN MULTIPLE GROUPINGS

(71) Applicant: Ab Initio Software LLC, Lexington, MA (US)

(72) Inventors: Bo Hjort Nielsen, Jamaica Plain, MA (US); Joseph Skeffington Wholey, III, Belmont, MA (US)

(73) Assignee: Ab Initio Technology LLC, Lexington, MA (US)

( * ) Notice: Subject to any disclaimer, the term of this patent is extended or adjusted under 35 U.S.C. 154(b) by 213 days.

(21) Appl. No.: 13/726,837

(22) Filed: Dec. 26, 2012

(65) Prior Publication Data

US 2014/0181742 A1    Jun. 26, 2014

(51) Int. Cl.
*G06F 3/0482* (2013.01)
*G06F 3/048* (2013.01)
*G06F 3/0481* (2013.01)
*G06F 17/30* (2006.01)

(52) U.S. Cl.
CPC ............ *G06F 3/0482* (2013.01); *G06F 3/0481* (2013.01); *G06F 17/30595* (2013.01)

(58) Field of Classification Search
CPC .................................................. G06F 3/0482
USPC ........................................................ 715/810
See application file for complete search history.

(56) References Cited

U.S. PATENT DOCUMENTS

| | | | |
|---|---|---|---|
| 6,003,040 A | 12/1999 | Mital et al. | |
| 6,725,227 B1 | 4/2004 | Li | |
| 7,456,840 B2 | 11/2008 | Molesky et al. | |
| 7,546,226 B1 | 6/2009 | Yeh et al. | |
| 7,590,672 B2 | 9/2009 | Slik et al. | |
| 7,844,582 B1 | 11/2010 | Arbilla et al. | |
| 7,970,240 B1 | 6/2011 | Chao et al. | |

(Continued)

FOREIGN PATENT DOCUMENTS

| | | |
|---|---|---|
| CN | 101084496 | 12/2007 |
| EP | 1258814 | 11/2002 |

(Continued)

OTHER PUBLICATIONS

Chinese Office Action, Application No. 200980148414.6, mailed May 10, 2013, 7 pages.

(Continued)

*Primary Examiner* — Tuyetlien Tran
*Assistant Examiner* — Richard Dottermusch
(74) *Attorney, Agent, or Firm* — Occhiuti & Rohlicek LLP (57) ABSTRACT

Interactions with data stored in a data storage system are managed through a view of an interface provided on a display. Information specifying multiple data elements and multiple groupings of related data elements is received. At least one of the data elements is a member of multiple of the groupings. A view is rendered that includes tokens representing respective data elements. At least some tokens include a selectable indicator including portions that indicate membership of the data element represented by that token in each of multiple groupings of related data elements. A first selection of a portion of one of the selectable indicators is received, corresponding to a first selected grouping of related data elements. In response to the first selection, tokens representing one or more other members of the first selected grouping of related data elements are rendered in the view.

36 Claims, 8 Drawing Sheets

(56) References Cited

U.S. PATENT DOCUMENTS

| | | | |
|---|---|---|---|
| 8,332,782 B1* | 12/2012 | Chang et al. | 715/853 |
| 2002/0030703 A1* | 3/2002 | Robertson et al. | 345/853 |
| 2003/0020762 A1* | 1/2003 | Budrys et al. | 345/835 |
| 2004/0181554 A1 | 9/2004 | Heckerman et al. | |
| 2005/0246352 A1 | 11/2005 | Moore et al. | |
| 2006/0095466 A1 | 5/2006 | Stevens et al. | |
| 2006/0106847 A1 | 5/2006 | Eckardt et al. | |
| 2006/0190844 A1 | 8/2006 | Binder et al. | |
| 2006/0218159 A1 | 9/2006 | Murphy et al. | |
| 2006/0294150 A1 | 12/2006 | Stanfill et al. | |
| 2007/0033220 A1 | 2/2007 | Drucker et al. | |
| 2007/0061287 A1 | 3/2007 | Le et al. | |
| 2007/0112875 A1 | 5/2007 | Yagawa | |
| 2007/0150496 A1 | 6/2007 | Feinsmith | |
| 2007/0255741 A1 | 11/2007 | Geiger et al. | |
| 2008/0163124 A1 | 7/2008 | Bonev et al. | |
| 2008/0172629 A1 | 7/2008 | Tien et al. | |
| 2010/0138431 A1 | 6/2010 | Bator et al. | |
| 2011/0041099 A1* | 2/2011 | Weise et al. | 715/854 |
| 2012/0209656 A1* | 8/2012 | Rojahn | 705/7.28 |
| 2012/0254805 A1* | 10/2012 | Pic et al. | 715/834 |

FOREIGN PATENT DOCUMENTS

| | | |
|---|---|---|
| EP | 1510937 | 3/2005 |
| JP | 11-307412 | 11/1999 |
| JP | 2002-288403 | 10/2002 |
| JP | 2005-122703 | 5/2005 |
| JP | 2008-134705 | 6/2008 |
| JP | 2008524671 | 7/2008 |
| WO | WO01/82068 | 11/2001 |
| WO | WO01/82072 | 11/2001 |
| WO | WO2005086906 | 9/2005 |
| WO | 2007002647 | 1/2007 |

OTHER PUBLICATIONS

Japanese Office Action (with English translation), Application No. 2011-514796, mailed Jun. 20, 2013, 9 pages.

Robertson et al., "Polyarchy Visualization: Visualizing Multiple Intersecting Hierarchies," *Computer Human Interaction—CHI*, pp. 423-430, 2002.

Nelson, Theodor Holm, "A Cosmology for a Different Computer Universe: Data Model, Mechanisms, Virtual Machine and Visualization Infrastructure," Journal of Digital Information, vol. 5, No. 1, 22 pages (2004).

Robertson, George G. "From Hierarchies to Polyarchies: Visualizing Multiple Relationships," Advanced Visual Interfaces 2000.

Karr, Alan, et al., "Data quality: A Statistical Perspective," Statistical Methodology 3 (2006), pp. 137-173.

DePauw, W., et al., "Web Services Navigator: Visualizing the Execution of Web Services." IBM Systems Journal, vol. 44, No. 4, 2005, pp. 821-845.

International Search Report & Written Opinion, PCT/US2013/062369, Feb. 28, 2014, 10 pages.

International Search Report & Written Opinion, PCT/US2013/076407, Jun. 18, 2014, 8 pages.

Japanese Office Action (with English translation), Application No. 2011-539652, mailed Dec. 16, 2013, 8 pages.

Japanese Office Action (with English translation), Application No. 2011-539651, mailed Oct. 11, 2013, 4 pages.

* cited by examiner

MANAGING INTERACTIONS WITH DATA HAVING MEMBERSHIP IN MULTIPLE GROUPINGS

BACKGROUND

This description relates to managing interactions with data having membership in multiple groupings.

Data in a storage device is typically organized according to a file system. A file system typically organizes data (e.g., files) in a hierarchy of directories that can each contain a group of files and/or other directories. The hierarchy of directories can be navigated using a path that implicitly or explicitly identifies a starting location and identifies one or more files and/or directories relative to the starting location.

A file system hierarchy can be represented as a tree of nodes, where a directory is a node with a branch for each item in the directory and a file is a leaf node. A branch between a node and its child represents a "contained in" relationship between the nodes. A path can include expressions including wildcards that filter a set of selected nodes.

SUMMARY

In one aspect, in general, a method for managing, through a view of an interface provided on a display, interactions with data stored in a data storage system includes: receiving information specifying multiple data elements and multiple groupings of related data elements, wherein at least one of the data elements is a member of multiple of the groupings; rendering a view that includes tokens representing respective data elements, at least some tokens including a selectable indicator including portions that indicate membership of the data element represented by that token in each of multiple groupings of related data elements; receiving a first selection of a portion of one of the selectable indicators corresponding to a first selected grouping of related data elements; and in response to the first selection, rendering in the view tokens representing one or more other members of the first selected grouping of related data elements.

Aspects can include one or more of the following features.

At least one of the groupings of related data elements is a hierarchical grouping of elements that are related according to a hierarchy.

Different portions of the selectable indicator that indicate membership in different groupings correspond to different data elements that have a parent relationship to the data element represented by that token.

The method further includes: receiving a second selection of a portion of one of the selectable indicators corresponding to a second selected grouping of related data elements; and in response to the second selection, rendering in the view tokens representing one or more other members of the second selected grouping of related data elements.

The method further includes, in response to the second selection, increasing a visual prominence of the second selected grouping relative to the first selected grouping.

The method further includes, in response to receiving input through the interface, changing one or more members of the first selected grouping of related data elements.

Changing one or more members includes one or more of: adding a data element to the first selected grouping, removing a data element from the first selected grouping, or moving or copying one or more data elements between the first selected grouping and another grouping of related data elements.

The selectable indicator of each token includes a sectioned shape, with different sections indicating membership of the data element represented by that token in different groupings of related data elements.

The sectioned shape is a sectioned ring.

The other members of the first selected grouping rendered in the view extend along a line aligned with sections of the shape indicating the first selected grouping.

The shape is dynamically divided into a number of sections that indicate the number of groupings of which the data element is a member.

Opposite sections of the sectioned shape indicate the same grouping of related data elements.

One or more sections rendered differently than each of the other sections indicate a grouping of which the data element is a parent data element.

In another aspect, in general, software is stored on a computer-readable medium, for managing, through an interface provided on a display, interactions with data stored in a data storage system. The software includes instructions for causing a computing system to: receive information specifying multiple data elements and multiple groupings of related data elements, wherein at least one of the data elements is a member of multiple of the groupings; render a view that includes tokens representing respective data elements, at least some tokens including a selectable indicator including portions that indicate membership of the data element represented by that token in each of multiple groupings of related data elements; receive a first selection of a portion of one of the selectable indicators corresponding to a first selected grouping of related data elements; and in response to the first selection, render in the view tokens representing one or more other members of the first selected grouping of related data elements.

In another aspect, in general, a computing system for managing interactions with data, through an interface provided on a display, includes: a data storage system storing data; and at least one processor configured to manage interactions with data stored in the data storage system. The processing includes: receiving information specifying multiple data elements and multiple groupings of related data elements, wherein at least one of the data elements is a member of multiple of the groupings; rendering a view that includes tokens representing respective data elements, at least some tokens including a selectable indicator including portions that indicate membership of the data element represented by that token in each of multiple groupings of related data elements; receiving a first selection of a portion of one of the selectable indicators corresponding to a first selected grouping of related data elements; and in response to the first selection, rendering in the view tokens representing one or more other members of the first selected grouping of related data elements.

In another aspect, in general, a computing system for managing interactions with data, through an interface provided on a display, includes: means for storing data; and means for manage interactions with data stored in the data storage system. The managing includes: receiving information specifying multiple data elements and multiple groupings of related data elements, wherein at least one of the data elements is a member of multiple of the groupings; rendering a view that includes tokens representing respective data elements, at least some tokens including a selectable indicator including portions that indicate membership of the data element represented by that token in each of multiple groupings of related data elements; receiving a first selection of a portion of one of the selectable indicators corresponding to a first selected grouping of related data elements; and in response to the first selection, rendering in the view tokens representing one or more other members of the first selected grouping of related data elements.

Aspects can include one or more of the following advantages.

The techniques described herein enable users to see different contexts and groupings in which an element of data or information exists. The user interface can display multiple groupings simultaneously, allowing the user to have a more complete understanding of the hierarchies and relationships between an element of data and other information. The user can also modify the contexts and related groupings of information more easily and accurately.

Other features and advantages of the invention will become apparent from the following description, and from the claims.

DESCRIPTION

Figure 1:
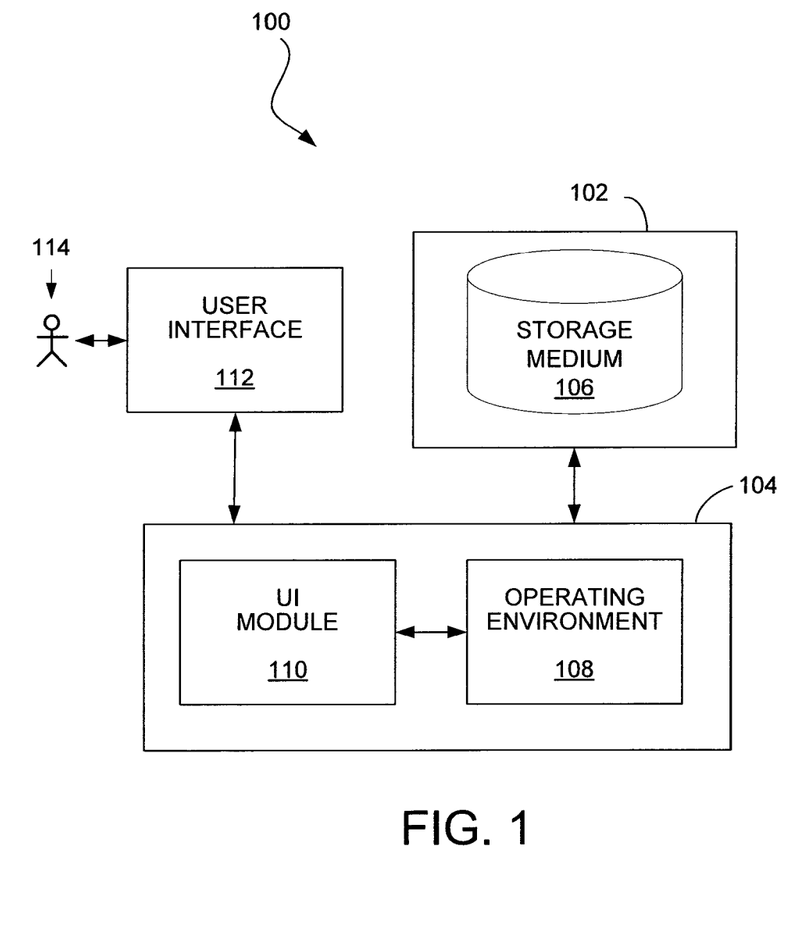
FIG. 1 is a block diagram of a data management system.

FIG. 1 shows an example of a data management system 100. The system 100 includes a data storage system 102 that stores data organized as data elements that are potentially in multiple groupings of related data elements. The data storage system 102 stores data elements and information defining the groupings and relationships between data elements in the groupings. A data element may be stored in any of a variety of data representations. For example, a data element can include a file or folder in a file system or data structures such as objects in a database, and may include text (e.g., text with relationships defined using hyperlinks), executable code or program specifications, multimedia data (e.g., images or video), or combinations of any of these.

The groupings can include hierarchical groupings in which the data elements are related according to a hierarchy. For example, a data element may represent a category, and there may be multiple data elements within that category. A data element within a category may represent a subcategory, and there may be multiple data elements within that subcategory. A data element may be categorized in multiple ways depending on what the data element represents and/or the contents of the data element (e.g., a data element that represents an animal may be categorized by species and by size; a data element that contains a news article may be categorized by subject matter, by geography, and by date).

A particular data element may be included in multiple groupings, and may have a particular position within each grouping. Generally, a data element has a position within each grouping that corresponds to its relationships with other data elements in that grouping. For example, in a grouping that is an ordered set, a data element has a position based on a sort order for an attribute of each data element. For a grouping that is a hierarchy, a data element is at a particular level of the hierarchy, depending on what data elements have parent or child relationships to that data element. For example, for a hierarchical grouping that corresponds to storage location in a file system, a data element may have a position determined by a parent relationship to its containing directory or folder. Sibling data elements having the same parent data element can also be ordered within a level of the hierarchy based on their attributes. Some relationships between data elements may be determined based on user input (e.g., a news editor may determine the categories and subcategories associated with a data element representing a news article). Some relationships may be computed dynamically with changes occurring in the categorization based on ongoing interaction with the data elements (e.g., membership in categories such as most recent articles, or most read articles). Some relationships may be determined based on predetermined attributes (e.g., a text message sent from a mobile communications device could be categorized by time sent, geographic region derived from the GPS coordinates of the sending device, and presence of certain key words in the message).

The data storage system 102 provides processes executing in a computing environment 104 of a computing system or device access to data stored in a storage medium 106. The data storage system 102 may be local to the computing system or device (e.g., an internal hard drive), or the data storage system 102 may be external to the computing system or device (e.g., a remote storage device or server). The computing environment 104 includes an operating environment 108 (e.g., an operating system) that accesses the data in the data storage system 102 and a user interface (UI) module 110 that provides a user interface 112 (e.g., a graphical view on a display arranged for receiving input from one or more input devices) that enables a user 114 to interact with the data elements. The UI module 110 arranges visual indicators in a graphical view that indicate membership of data elements in potentially multiple groupings. The user 114 is able to select different portions of the visual indicator to view a data element in the context of any particular grouping or in the context of multiple groupings simultaneously. The UI module 110 also enables the user 114 to modify the groupings, add new data elements to the groupings, remove data elements from the groupings, and create new groupings. In some implementations, data elements are assigned permissions that restrict some sets of users from seeing or altering data elements and/or relationships between data elements.

The computing environment 104 may be hosted on one or more computers, and the operating environment 108 can include a local operating system, or a multiple-node parallel computing environment hosted by a configuration of computer systems using multiple central processing units (CPUs), either local (e.g., multiprocessor systems such as SMP computers), or locally distributed (e.g., multiple processors coupled as clusters or MPPs), or remote, or remotely distributed (e.g., multiple processors coupled via a local area network (LAN) and/or wide-area network (WAN)), or any combination thereof.

Figure 2A:
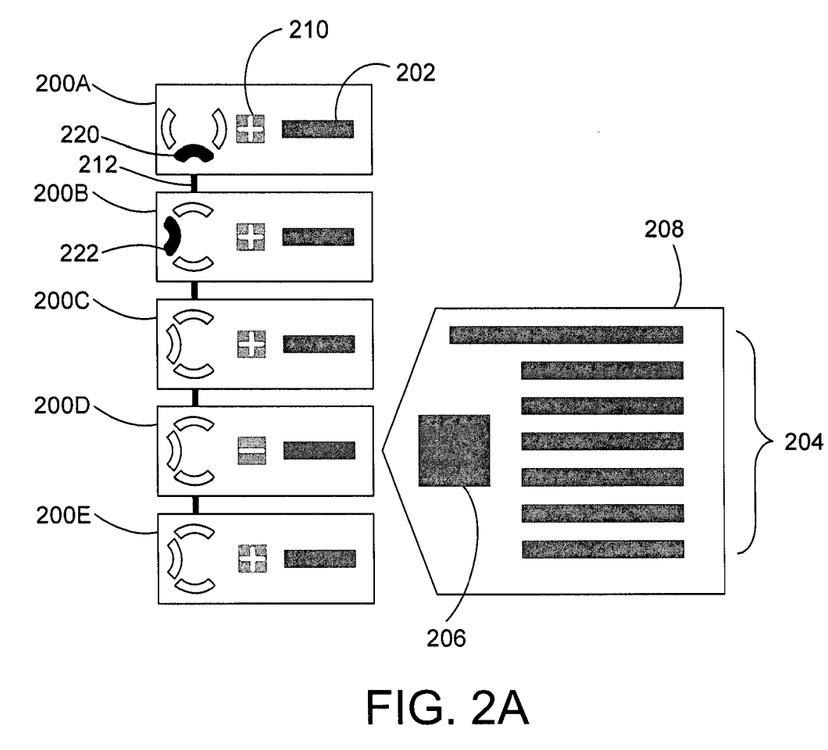
FIG. 2A is a schematic diagram of a chain of tokens.

The operating environment 108 enables the UI module 110 to communicate with the data storage system 102 to receive information identifying data elements stored in the data storage system 102 and update a graphical view on a display based on user interaction. For example, referring to FIG. 2A, a graphical view rendered by the UI module 110 displays tokens (200A-200E) representing related data elements chosen by a user (e.g., by following a hyperlink from some other data element or from another system, by navigating hierarchical relationships, or by initiating a search that results in the data elements). In FIG. 2A, some tokens (200A-200C, 200E) are displayed in a collapsed form that shows each token along with brief summary information 202 (e.g., values of a one or more identifying attributes such as title, author, etc.). One token 200D is displayed in an expanded form that displays content of the data element represented by the token (e.g., text 204 and image 206 associated with a document) in an extended graphical element 208 in proximity to the token or associated with the token (e.g., in a scrollable window visually associated with the token). A user interface element 210 associated with the tokens enables a user to select whether to view the token in expanded or collapsed form.

The UI module 110 indicates relationships among the data elements by displaying graphical associations among the corresponding tokens. One way in which the relationships are indicated is by displaying tokens aligned along a particular direction and/or connected by a line 212 to illustrate a particular relationship among the data elements that they represent. One type of relationship that can be illustrated for a hierarchical grouping is based on parent-child relationships, where data elements that are siblings have a child relationship to a common parent data element. For example, in FIG. 2A, multiple child data elements contained in the same parent data element are rendered as a chain of tokens, with a token 200A at the head end of the chain representing the parent data element, and the child data elements, which are siblings of each other, with tokens 200B-200E linked one after the other ordered according to some sort order (or in an arbitrary order).

Figure 2B:
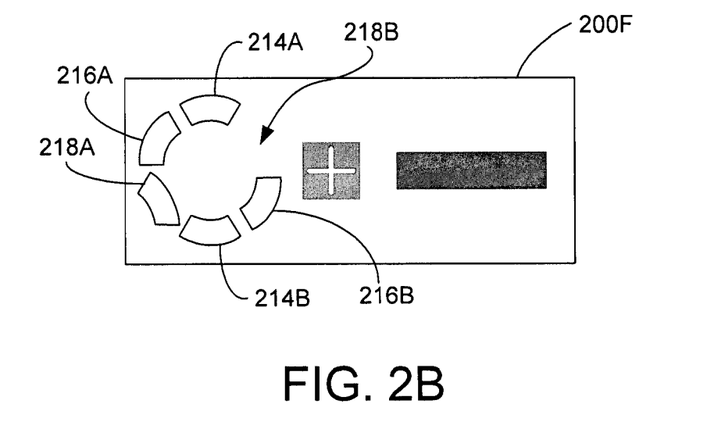
FIG. 2B is a schematic diagram of a token with a selectable indicator.

The UI module 110 enables a user to navigate among data elements by interacting with selectable indicators on the tokens. Referring to FIG. 2B, a token 200F includes a selectable indicator that indicates to a user how many groupings of related data elements exist for the data element represented by that token 200F. The selectable indicator includes different individually selectable portions 214A/B, 216A/B, 218A that indicate membership of the data element represented by that token in each of multiple groupings. In this example, the selectable portions include pairs of opposing sections of a ring. A first pair of opposing sections 214A and 214B indicates membership in a first grouping (with a first parent data element), and a second pair of opposing sections 216A and 216B indicates membership in a second grouping (with a second parent data element). An unpaired section 218A with a blank space 218B where the opposing section would have been and curving outward away from the center of the ring is distinguished from the other sections to indicate a potential grouping of which the data element of that token 200F is the parent. The appearance of the section can indicate whether or not there are any child data elements in that potential grouping. The unpaired section 220 of the selectable indicator of token 200A is solid to indicate that its data element does have one or more child data elements (whose tokens are visible in this example). The unpaired section 222 of the selectable indicator of token 200B is also solid to indicate that its data element does have one or more child data elements (whose tokens are not visible in this example). The unpaired sections of the selectable indicators of tokens 200C-200E are not solid indicating that the corresponding data elements do not have any child data elements. In alternative embodiments, other sectioned shapes can be used instead of a sectioned ring (e.g., a square or other polygon).

The selectable portions also enable the user to expand or collapse particular groupings (e.g., by selecting one of the sections to initiate either action). An expand action or collapse action initiated by a user displays or removes from display, respectively, tokens for related data elements in the selected grouping. When a collapsed grouping is expanded to show related data elements, the UI module 110 requests information about the related data elements from the data storage system 102. For example, if a section representing a hierarchical grouping is selected for expansion, the data storage system 102 returns the parent data element within that selected grouping and the data elements that are siblings to the current data element with respect to that parent data element. The UI module 110 can render a token for each data element returned. Information about the data elements and the groupings from the data storage system 102 can also be stored locally in the computing environment 103 (e.g., in a cache), such that the UI module 110 is not required to request information from the data storage system 102 for every interaction within the user interface 112.

Figure 3A:
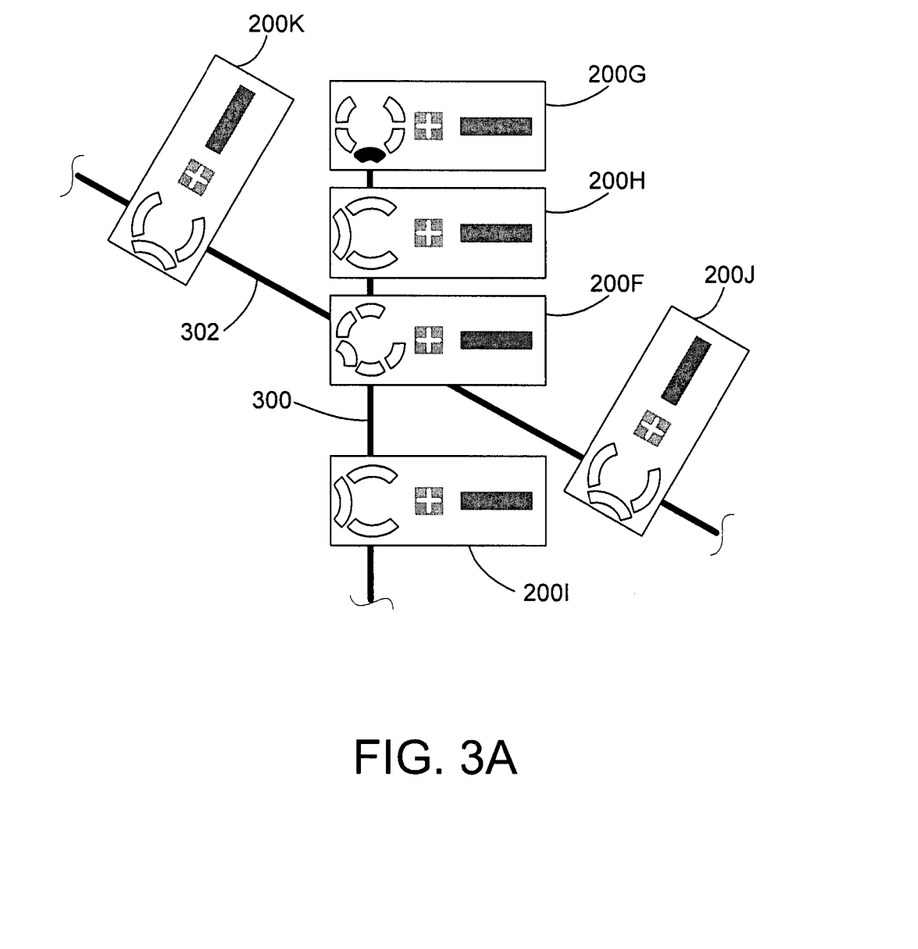
FIGS. 3A-3D, 4 are schematic diagrams of intersecting chains of tokens.

Groupings that are expanded can be rendered in a variety of ways. Referring to FIG. 3A, token 200F is rendered at an intersection between two chains: a first chain including tokens 200E-200I (and other tokens not shown), and a second chain including tokens 200F, 200J-200K (and other tokens not shown). The data element represented by token 200F has a parent data element represented by a token 200G at the head of the first chain, and a parent data element represented by a token (not shown) at the head of the second chain. Alternatively, in some implementations, the parent data element of each chain is not displayed as a token at the head of the chain, but is instead implicitly indicated (e.g., by color or some other visual attribute) or displayed at a different location. The other tokens in the expanded chains representing the groupings of data element X can be displayed in a particular order associated with each grouping. In the example of FIG. 3A, the line 300 connecting the first chain is vertical to be aligned with the first pair of sections 214A/B, and the line 302 connecting the second chain is at an angle to be aligned with the second pair of sections 216A/B. In some implementations, the UI module 110 rotates the selectable indicators and any already expanded chains such that the most recently expanded chain is shown in a specific orientation within the graphical view (e.g., vertical).

Figure 3B:
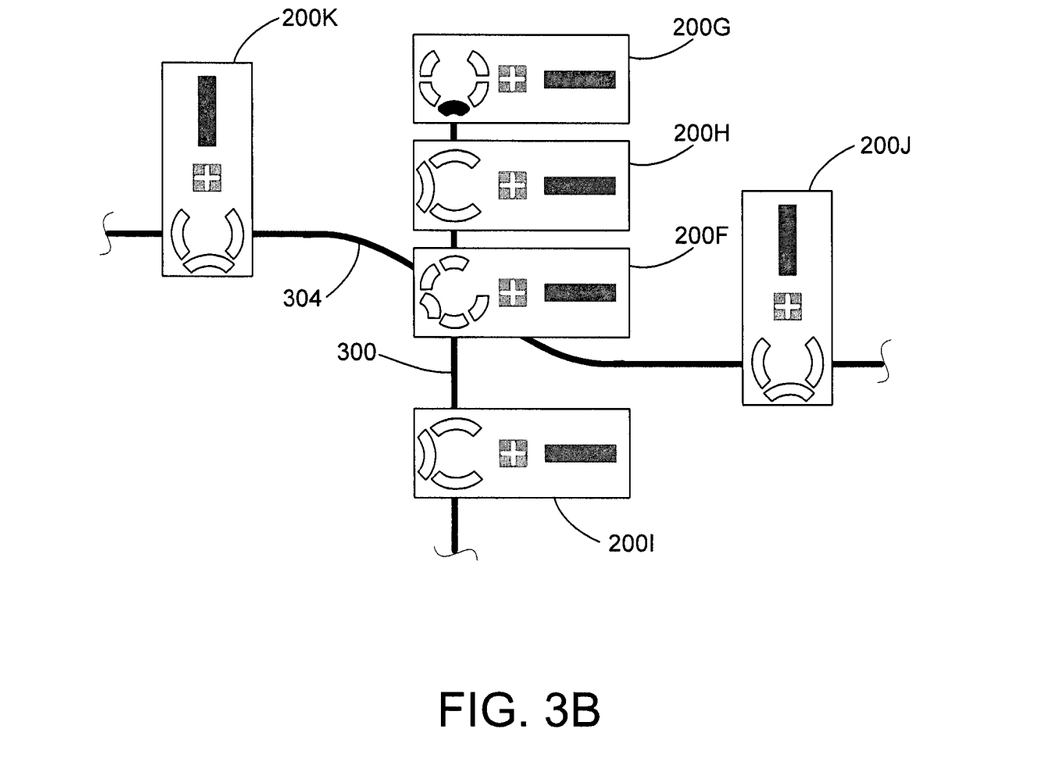
Figure 3C:
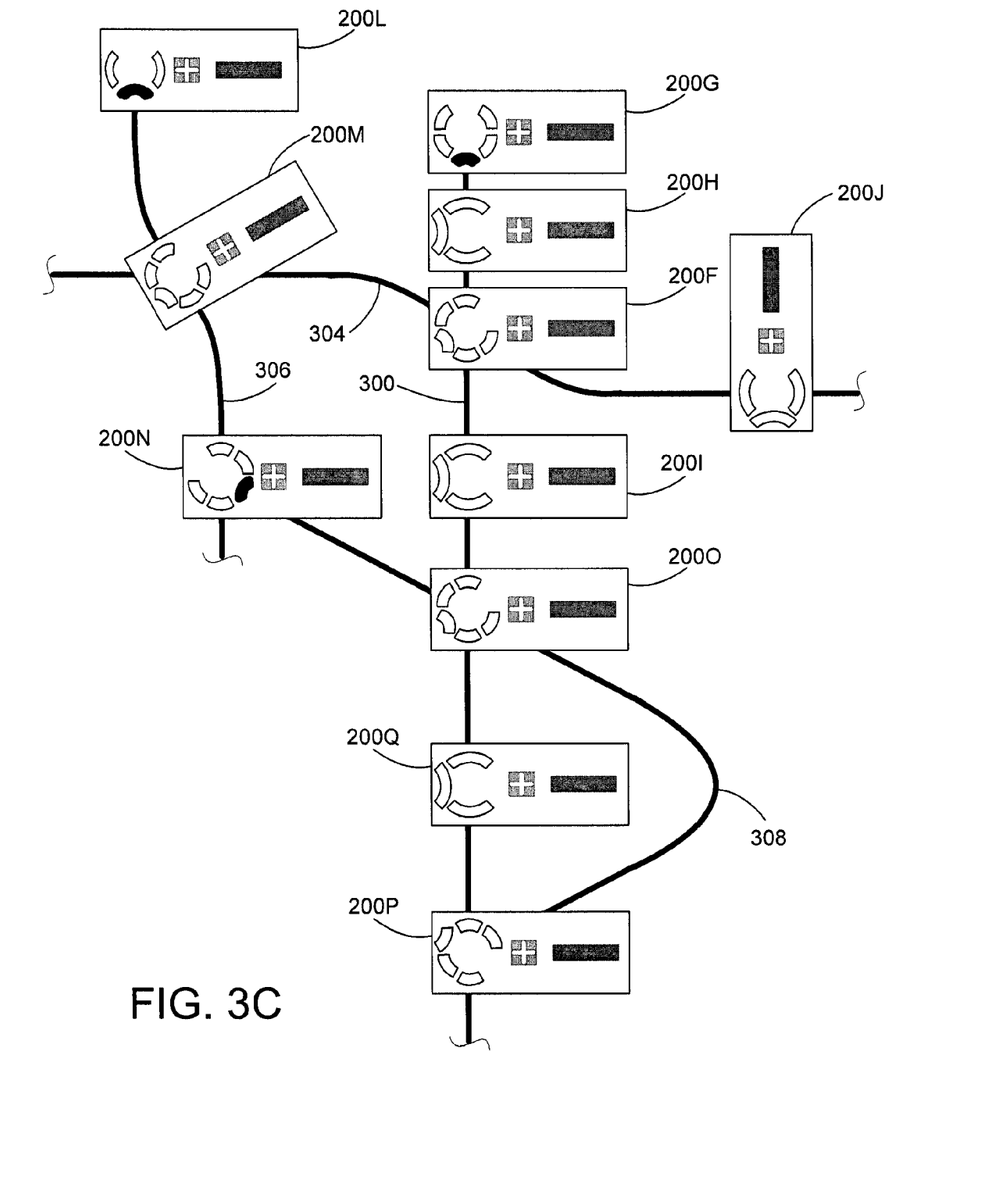
Figure 3D:
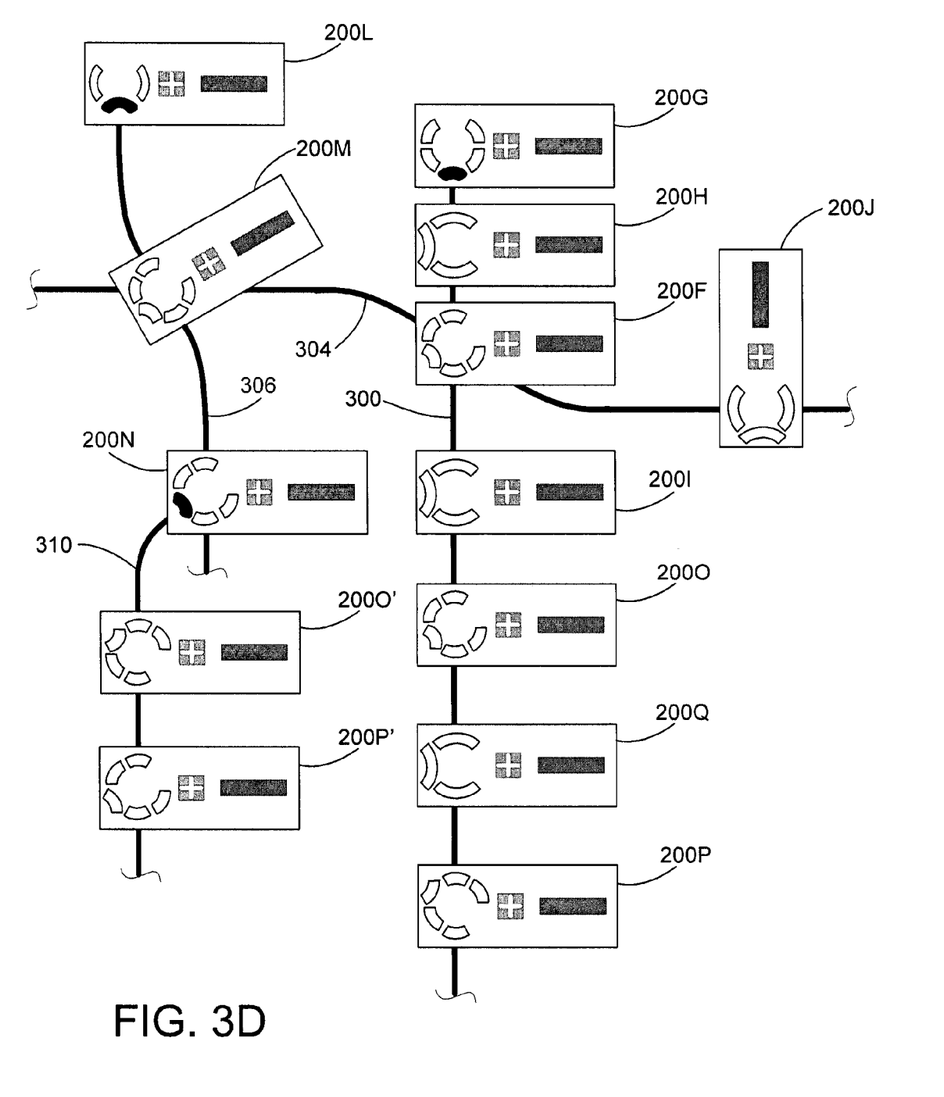

In some cases, such as for groupings expanded from multiple tokens, it is useful to render the lines for each of the groupings to preserve alignment with the sections of the indicators while also making more efficient use of screen space. Various techniques can be used to schematically arrange the lines extending from tokens at the intersection of two or more chains, such as in the network diagrams used for some subway maps (e.g., as popularized by Henry Charles Beck's London Underground Tube map, which was based on techniques for electrical circuit diagrams). FIG. 3B shows an example in which a curved line 304 connecting the second chain includes a portion that is aligned with the second pair of sections 216A/B and portions on either side of token 200F that curve into horizontal lines to render the other tokens 200J and 200K perpendicular to token 200F (e.g., to make more efficient use of screen space in the graphical view). FIG. 3C shows an example that includes two additional chains: a curved line 306 connecting a third chain that includes tokens 200L (at the head), 200M, and 200N; and a curved line 308 connecting a fourth chain that includes tokens 200N (at he head), 200O, and 200P. In this example, there are two data elements that are both members of two particular groupings, so their respective tokens 200O and 200P are show as connected to two different chains—the chain connected by the line 300 and the chain connected by the line 308. For example, if some of the data elements represent articles, the tokens connected by the line 300 may represent articles sharing a first attribute (e.g., date) within a "folder" represented by token 200G, and the tokens connected by the line 308 may represent articles sharing a second attribute (e.g., topic) within a "folder" represented by token 200N.

In some implementations, the data storage system 102 sends the UI module 110 information (with or without an explicit request from the UI module 110 or the operating environment 108) about changes to data elements, enabling the graphical view to be dynamically updated. For example, the UI module 110 can add or remove tokens for data elements that are added or removed, or can update a selectable indicator to indicate a different number of groupings if the number of groupings that contain the current data element changes. For example, the UI module 110 can indicate membership of the element in additional groupings by dividing the ring into more sections as the element is placed into more groupings.

The UI module 110 can provide UI elements for a user to create new data elements, edit existing data elements (e.g., changing its content), or change the relationships between data elements (e.g., adding or removing a data element to or from a grouping under a parent containing data element, or altering the order of data elements within a grouping). Permissions can be configured to restrict some of these activities, and the UI module 110 can graphically indicate these restrictions in any of a number of ways. For example, a data element with content that cannot be altered by a user may be displayed to that user in a particular color scheme or with certain user interface elements disabled or missing.

Figure 4:
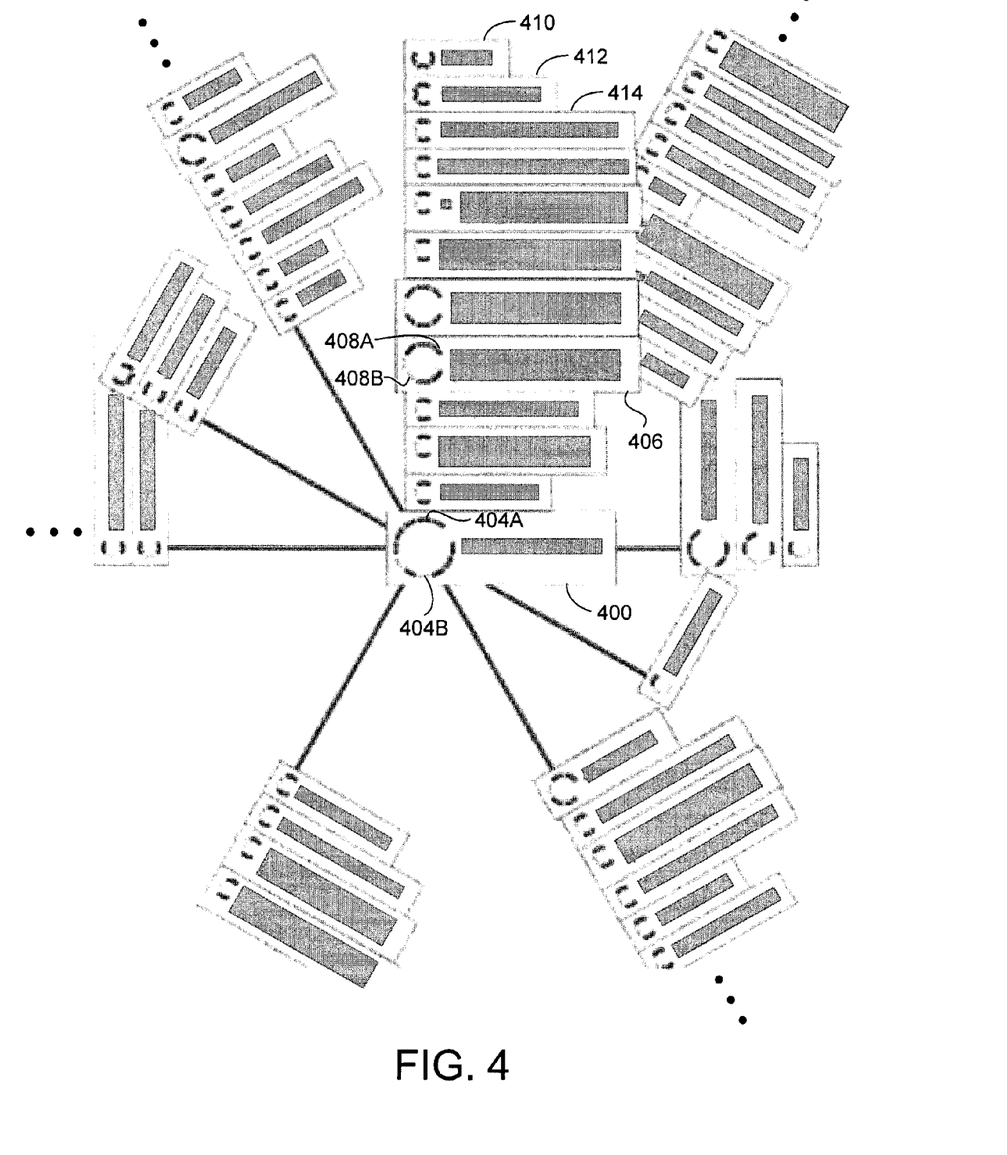

Referring to FIG. 4, a portion of a graphical view shows a central token 400 for a currently selected token, with five expanded groupings in which the corresponding data element is a member. Various techniques can be used to visually indicate which token is currently selected, and which grouping was most recently expanded or selected. In some implementations, a more recently selected grouping is shown in a particular orientation (e.g., vertical) or shown with greater prominence, for example, in larger font, with different colors, highlighting, or overlapping tokens of the grouping on top of tokens of previous groupings. In some implementations, the prominence of the less recently selected groupings is lowered. For example, the text can be dimmed or grayed, or the other tokens in the grouping can be extended in radial directions further away from the central token 400 to create more space for tokens of the more recently selected grouping. The UI module 110 can also allow a user to alter the layout of the tokens or chains. For example, a user may be allowed to rotate the chains shown around a token, or raise or lower prominence the display of groupings within the view.

The sections of the selectable indicator can also be visually distinguished (e.g., grayed or shown in a lighter shade) to indicate other aspects of a data element with respect to different groupings. For a data element that is last in an order among data elements in a grouping, one of the sections at the end of the chain representing that grouping can be grayed or shown in a lighter shade than the opposite section. For example, the pair 404A/B including the solid top section 404A and the lighter shade bottom section 404B of the selectable indicator of the central token 400 indicates that the corresponding data element of the token 400 is last in the grouping represented by that pair 404A/B aligned with the vertical token chain. For the central token 400 this position of the data element is also evident since the vertical token chain is expanded and the token 400 occurs at the end of the chain. The selectable indicator of the token 406 also includes a pair 408A/B with one solid section 408A and one lighter shade section 408B, indicating that the corresponding data element is last in the grouping represented by that pair 408A/B, which is currently collapsed. The pairs of sections aligned with the vertical chain can also share visual attributes with each other, such as color.

In this example, the token 410 at the head of the vertical chain represents a parent data element of each of the data elements represented by the other tokens in the chain, which have a sibling relationship to each other. As described above with respect to FIG. 2A, in addition to the parent token 410 being at the head of the chain, its selectable indicator is distinguished from the others in the vertical chain to visually represent that the token 410 represents the parent data element. In particular, the top section is blank and the unpaired bottom section has an inverted curvature. In this example, other tokens include selectable indicators with an unpaired inverted section shaded to indicate whether or not the corresponding data element has children data elements. The darker shading indicates that the corresponding data element is the parent of at least one child data element, as in token 412 (in a grouping that is currently collapsed). The lighter shading indicates that the corresponding data element does not have any child data elements, as in token 414.

The selectable indicator of the central token 400 includes 5 paired sections, indicating membership of the corresponding data element in 5 different groupings. Selection of a section brings the corresponding grouping into focus, for example, by expanding the chain of tokens for related data elements (if not already expanded) and rotating the chain to the vertical orientation. In the example of FIG. 4, all 5 groupings are expanded, with tokens extending in the radial direction, aligned with the respective pairs of sections on the selectable indicator of token 400. Selection of a section for an already expanded grouping can also collapse the grouping so that the tokens for the other members of the grouping are no longer displayed. In some implementations, various UI interactions can enable different changes to the graphical view. For example, clicking on a portion of an expanded grouping and rotating it to the top of the view can bring the selected grouping into focus, while clicking on a portion of an expanded grouping and dragging toward the central token 400 can collapse the selected grouping.

Each of the tokens shown in the groupings also have respective selectable indicators shown. A user can select any token shown in the graphical view to bring the selected token into focus, for example, bringing the selected token to the center of the view and enlarging the selected token. The expanded groupings can be automatically reoriented to be shown relative to the newly selected central token. The user can then select portions of the selectable indicator of the newly selected token to expand any of the groupings of which the data element of the newly selected token is a member. The previously expanded groupings can still be shown relative to the newly selected token when appropriate, or relative to the previously selected token when the newly selected token is not a member of such groupings. The user interface can include a user control element that enables all unrelated groupings to close to focus on the newly selected token. Interaction with the user interface can also enable data elements to be added to groupings, removed from groupings, moved from one grouping to another grouping, and reordered within groupings. Groupings can also be added, removed, and moved to change hierarchy structures.

Figure 5:
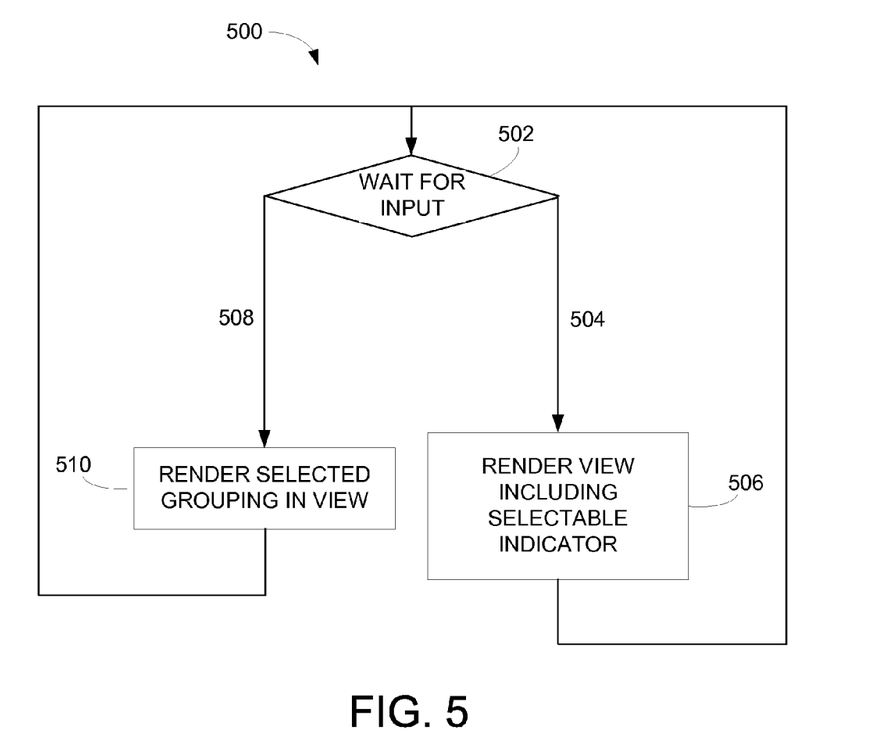
FIG. 5 is a flowchart of an example of a procedure for managing interactions.

FIG. 5 shows a flowchart for an exemplary procedure 500 for the UI module 110 to manage interactions. The UI module 110 is in a state 502 in which it is responsive to input, either from the user 114 over the user interface 112, or from the operating environment 108. When generating a graphical view on a display, the UI module 110 receives (504) information specifying multiple data elements and multiple groupings of related data elements. The UI module renders (506) a view that includes tokens representing respective data elements. In some cases, a data element is a member of multiple of the groupings, and the token representing that data element includes a selectable indicator including portions that indicate membership of the data element represented by that token in each of multiple groupings of related data elements. From the responsive state 502, the UI module 110 may receive (508) a selection of a portion of one of the selectable indicators corresponding to a particular selected grouping of related data elements. In response to that selection, the UI module 110 renders in the view tokens representing one or more other members of that particular selected grouping of related data elements.

The techniques approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing, through a view of an interface provided on a display, interactions with data stored in a data storage system, the method including:
   receiving information specifying multiple data elements and multiple groupings of related data elements, wherein at least one of the data elements is a member of multiple of the groupings;
   rendering a view that includes tokens representing respective data elements, at least some tokens including a selectable indicator including multiple portions, where the multiple portions are individually selectable and the multiple portions indicate membership of the data element represented by that token in each of multiple groupings of related data elements;
   receiving a first selection of a first portion of the multiple portions of one of the selectable indicators corresponding to a first selected grouping of related data elements; and
   in response to the first selection, rendering in the view tokens representing one or more other members of the first selected grouping of related data elements;
   wherein the selectable indicator of each token includes a sectioned shape, with different sections indicating membership of the data element represented by that token in different groupings of related data elements.

2. The method of claim 1, wherein at least one of the groupings of related data elements is a hierarchical grouping of elements that are related according to a hierarchy.

3. The method of claim 2, wherein different portions of the selectable indicator that indicate membership in different groupings correspond to different data elements that have a parent relationship to the data element represented by that token.

4. The method of claim 1, further including:
   receiving a second selection of a portion of one of the selectable indicators corresponding to a second selected grouping of related data elements; and
   in response to the second selection, rendering in the view tokens representing one or more other members of the second selected grouping of related data elements.

5. The method of claim 4, further including, in response to the second selection, increasing a visual prominence of the second selected grouping relative to the first selected grouping.

6. The method of claim 1, further including, in response to receiving input through the interface, changing one or more members of the first selected grouping of related data elements.

7. The method of claim 6, wherein changing one or more members includes one or more of: adding a data element to the first selected grouping, removing a data element from the first selected grouping, or moving or copying one or more data elements between the first selected grouping and another grouping of related data elements.

8. The method of claim 1, wherein the sectioned shape is a sectioned ring.

9. The method of claim 1, wherein the other members of the first selected grouping rendered in the view extend along a line aligned with sections of the shape indicating the first selected grouping.

10. The method of claim 1, wherein the shape is dynamically divided into a number of sections that indicate the number of groupings of which the data element is a member.

11. The method of claim 1, wherein opposite sections of the sectioned shape indicate the same grouping of related data elements.

12. The method of claim 1, wherein one or more sections rendered differently than each of the other sections indicate a grouping of which the data element is a parent data element.

13. Software stored on a non-transitory computer-readable medium, for managing, through an interface provided on a display, interactions with data stored in a data storage system, the software including instructions for causing a computing system to:
- receive information specifying multiple data elements and multiple groupings of related data elements, wherein at least one of the data elements is a member of multiple of the groupings;
- render a view that includes tokens representing respective data elements, at least some tokens including a selectable indicator including multiple portions, where the multiple portions are individually selectable and the multiple portions indicate membership of the data element represented by that token in each of multiple groupings of related data elements;
- receive a first selection of a first portion of the multiple portions of one of the selectable indicators corresponding to a first selected grouping of related data elements; and
- in response to the first selection, render in the view tokens representing one or more other members of the first selected grouping of related data elements;
- wherein the selectable indicator of each token includes a sectioned shape, with different sections indicating membership of the data element represented by that token in different groupings of related data elements.

14. The software of claim 13, wherein at least one of the groupings of related data elements is a hierarchical grouping of elements that are related according to a hierarchy.

15. The software of claim 14, wherein different portions of the selectable indicator that indicate membership in different groupings correspond to different data elements that have a parent relationship to the data element represented by that token.

16. The software of claim 13, further including instructions for causing the computing system to:
- receive a second selection of a portion of one of the selectable indicators corresponding to a second selected grouping of related data elements; and
- in response to the second selection, render in the view tokens representing one or more other members of the second selected grouping of related data elements.

17. The software of claim 16, further including instructions for causing the computing system to, in response to the second selection, increase a visual prominence of the second selected grouping relative to the first selected grouping.

18. The software of claim 13, further including instructions for causing the computing system to, in response to receiving input through the interface, change one or more members of the first selected grouping of related data elements.

19. The software of claim 18, wherein changing one or more members includes one or more of: adding a data element to the first selected grouping, removing a data element from the first selected grouping, or moving or copying one or more data elements between the first selected grouping and another grouping of related data elements.

20. The software of claim 13, wherein the sectioned shape is a sectioned ring.

21. The software of claim 13, wherein the other members of the first selected grouping rendered in the view extend along a line aligned with sections of the shape indicating the first selected grouping.

22. The software of claim 13, wherein the shape is dynamically divided into a number of sections that indicate the number of groupings of which the data element is a member.

23. The software of claim 13, wherein opposite sections of the sectioned shape indicate the same grouping of related data elements.

24. The software of claim 13, wherein one or more sections rendered differently than each of the other sections indicate a grouping of which the data element is a parent data element.

25. A computing system for managing interactions with data, through an interface provided on a display, the computing system including:
- a data storage system storing data; and
- at least one processor configured to manage interactions with data stored in the data storage system, the managing including:
  - receiving information specifying multiple data elements and multiple groupings of related data elements, wherein at least one of the data elements is a member of multiple of the groupings;
  - rendering a view that includes tokens representing respective data elements, at least some tokens including a selectable indicator including multiple portions, where the multiple portions are individually selectable and the multiple portions indicate membership of the data element represented by that token in each of multiple groupings of related data elements;
  - receiving a first selection of a first portion of the multiple portions of one of the selectable indicators corresponding to a first selected grouping of related data elements; and
  - in response to the first selection, rendering in the view tokens representing one or more other members of the first selected grouping of related data elements;
  - wherein the selectable indicator of each token includes a sectioned shape, with different sections indicating membership of the data element represented by that token in different groupings of related data elements.

26. The computing system of claim 25, wherein at least one of the groupings of related data elements is a hierarchical grouping of elements that are related according to a hierarchy.

27. The computing system of claim 26, wherein different portions of the selectable indicator that indicate membership in different groupings correspond to different data elements that have a parent relationship to the data element represented by that token.

28. The computing system of claim 25, the managing further including:
- receiving a second selection of a portion of one of the selectable indicators corresponding to a second selected grouping of related data elements; and
- in response to the second selection, rendering in the view tokens representing one or more other members of the second selected grouping of related data elements.

29. The computing system of claim 28, the managing further including, in response to the second selection, increasing a visual prominence of the second selected grouping relative to the first selected grouping.

30. The computing system of claim 25, the managing further including, in response to receiving input through the interface, changing one or more members of the first selected grouping of related data elements.

31. The computing system of claim 30, wherein changing one or more members includes one or more of: adding a data element to the first selected grouping, removing a data element from the first selected grouping, or moving or copying one or more data elements between the first selected grouping and another grouping of related data elements.

32. The computing system of claim 25, wherein the sectioned shape is a sectioned ring.

33. The computing system of claim 25, wherein the other members of the first selected grouping rendered in the view extend along a line aligned with sections of the shape indicating the first selected grouping.

34. The computing system of claim 25, wherein the shape is dynamically divided into a number of sections that indicate the number of groupings of which the data element is a member.

35. The computing system of claim 25, wherein opposite sections of the sectioned shape indicate the same grouping of related data elements.

36. The computing system of claim 25, wherein one or more sections rendered differently than each of the other sections indicate a grouping of which the data element is a parent data element.

* * * * *